(12) United States Patent
Wier

(10) Patent No.: US 6,416,003 B1
(45) Date of Patent: Jul. 9, 2002

(54) BELT REEL FOR A BELT RETRACTOR OF A VEHICLE OCCUPANT RESTRAINT SYSTEM

(75) Inventor: Franz Wier, Göggingen (DE)

(73) Assignee: TRW Occupant Restraint Systems GmbH & Co. KG, Alfdorf (DE)

( * ) Notice: Subject to any disclaimer, the term of this patent is extended or adjusted under 35 U.S.C. 154(b) by 0 days.

(21) Appl. No.: 09/327,691

(22) Filed: Jun. 8, 1999

(30) Foreign Application Priority Data

Jun. 8, 1998 (DE) ..................... 298 10 223 U

(51) Int. Cl.⁷ ................ B65H 75/48; B60R 22/38
(52) U.S. Cl. ............... 242/376; 242/383.3; 242/384.3; 242/610.5; 280/807
(58) Field of Search ............. 242/376, 610.1, 242/610.5, 382, 383.3, 384.3; 280/807; 297/475, 476, 477, 478

(56) References Cited

U.S. PATENT DOCUMENTS 1,404,934 A  *  1/1922  Cunningham ............ 242/610.5
2,650,655 A  *  9/1953  Neahr et al. ............. 242/384.3
3,851,835 A  * 12/1974  Fohl ....................... 242/384.3
4,560,115 A  * 12/1985  Toyama et al. ......... 242/384.3

FOREIGN PATENT DOCUMENTS

| DE | 2229502   | 1/1973  |
| DE | 2728155   | 12/1978 |
| DE | 4109782   | 10/1991 |
| DE | 4137029   | 5/1992  |
| DE | 4434738   | 3/1995  |
| DE | 4426479   | 2/1996  |
| DE | 29703665  | 6/1997  |

* cited by examiner

Primary Examiner—John Q. Nguyen
(74) Attorney, Agent, or Firm—Tarolli, Sundheim, Covell, Tummino & Szabo L.L.P.

(57) ABSTRACT

A belt reel for a belt retractor of a vehicle occupant restraint system comprises a cylindrical spool adapted for accommodation of a belt webbing and at least a first collar arranged at a first axial end of the spool. The spool consists of at least one sheet-metal sleeve, and the collar is formed by a sheet-metal disk.

5 Claims, 7 Drawing Sheets

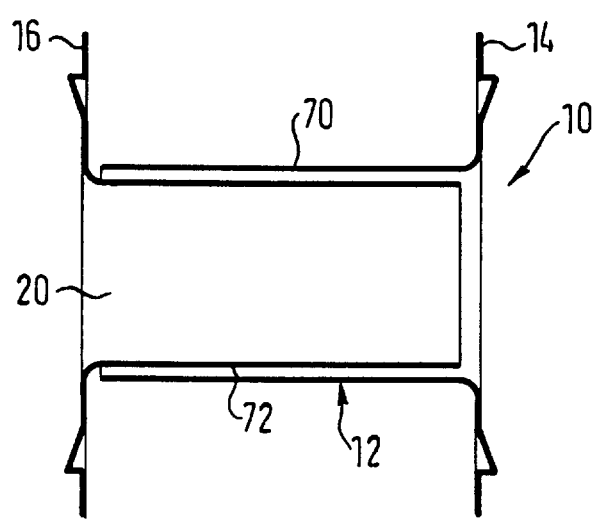
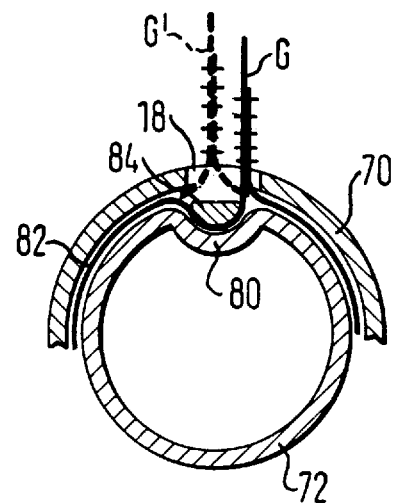
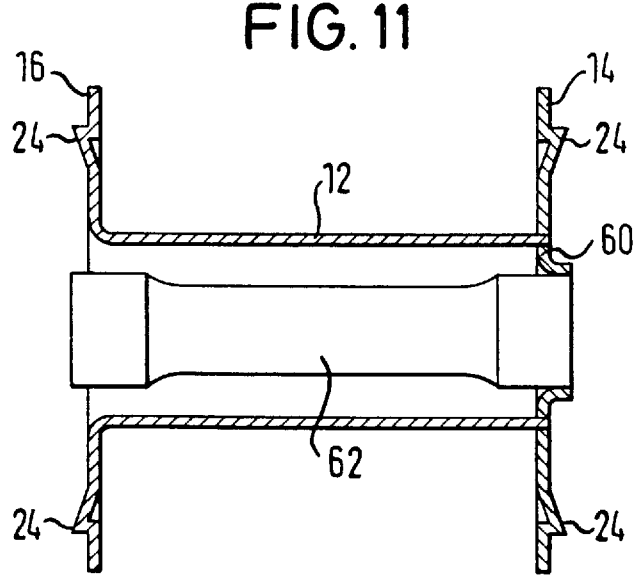

BELT REEL FOR A BELT RETRACTOR OF A VEHICLE OCCUPANT RESTRAINT SYSTEM

The invention relates to a belt reel for a belt retractor of a vehicle occupant restraint system.

BACKGROUND OF THE INVENTION

A belt reel for a seat belt retractor comprises a cylindrical spool for a belt webbing as well as at least one collar arranged at an axial end of the spool.

Typically, the belt reel is connected to a coiling spring which biases the belt reel in the winding direction of the belt webbing. Under normal operating circumstances the belt webbing can be freely withdrawn from the belt retractor against the force of the coiling spring, whereas when a webbing-sensitive or vehicle-sensitive locking mechanism is activated the belt reel is blocked so that the belt webbing cannot be withdrawn any further from the belt retractor. In this condition tensile forces in the belt webbing resulting from deceleration forces acting on a vehicle occupant in a possible collision are directed via the belt reel and the belt retractor into the vehicle. This is why the belt reel needs to be dimensioned such that it withstands the forces occurring in such a case under all circumstances. At the same time the intention is to dimension the belt reel as small as possible to enhance the capacity for receiving the belt webbing.

Belt reels are known hitherto from prior art which are either configured as a die-cast component or consist of a plastic-jacketed steel axle. Such designs are, however, a disadvantage both as regards their cost and their weight.

It is thus the object of the invention to provide a belt reel for a belt retractor which can be manufactured significantly cheaper and is less heavy.

BRIEF DESCRIPTION OF THE INVENTION

This object is achieved with a belt reel for a belt retractor of a vehicle occupant restraint system, which comprises a cylindrical spool adapted for accommodation of a belt webbing and at least a first collar arranged at a first axial end of the spool. The spool consists of at least one sheet-metal sleeve, and the collar is formed by a sheet-metal disk. Despite sheet metal being used as the material for the belt reel a surprisingly high strength can be achieved since the basic shapes used, i.e. a sleeve and a disk, have a very high strength with regard to the loads acting on them. Accordingly, despite a low material expenditure the necessary high strength materialises for a very low weight. On top of this, sheet metal is relatively simple to work or shape, this in turn resulting in low production costs.

In accordance with a preferred embodiment of the invention it is provided for that the collar and the spool are configured integrally with each other. In this configuration the belt reel, preferably comprising a collar at each axial end, can be produced starting from a tube section, the axial ends of which are widened such that they each finally form a collar at the axial end of the belt reel. The spool is formed by the non-shaped section between the two axial ends of the tube section. Since all parts are configured integrally with each other a particularly high strength materialises whilst at the same time necessitating merely one low-cost step in forming the belt reel.

In accordance with another preferred embodiment it is provided for that the spool consists of two telescoped sheet-metal sleeves. Each of the sheet-metal sleeves is provided at one of its axial ends with the collar, produced, for example, by shaping an axial end of the tube section. Since the spool consists of two sheet-metal sleeves it features an even higher strength. When, in addition, as provided for in accordance with a further preferred embodiment, at least the outer of the two sheet-metal sleeves comprises a slot for passage of the belt webbing, then the belt webbing can be clamped between the two sheet-metal sleeves by simple ways and means. This minimises the expense of reliably defining the belt webbing on the belt reel.

Advantageous aspects of the invention read from the sub-claims.

BRIEF DESCRIPTION OF THE DRAWINGS

The invention will now be described with reference to various embodiments as illustrated in the attached drawings in which:

FIG. 11 is a longitudinal section through a belt reel in accordance with a third variant of the first embodiment;

FIG. 12 is a schematic longitudinal section through a belt reel in accordance with a second embodiment of the invention;

FIG. 13 is a cross-section through a belt reel in accordance with a first variant of the second embodiment;

DETAILED DESCRIPTION OF THE INVENTION

Figure 1:
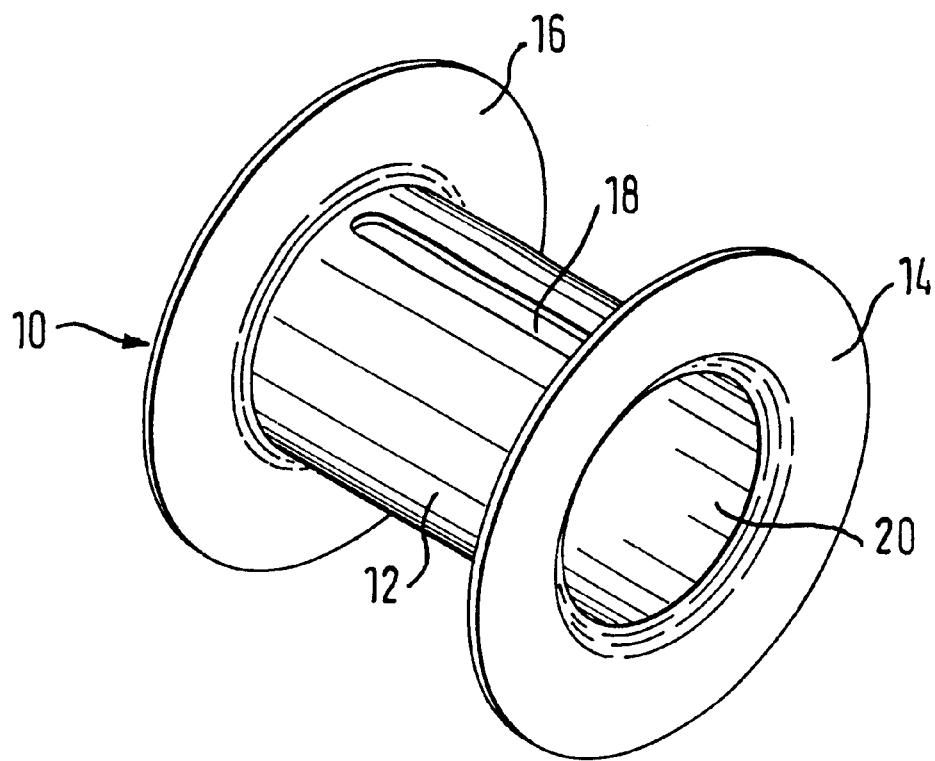
FIG. 1 is a perspective view of a belt reel in accordance with a first embodiment of the invention.
Figure 2:
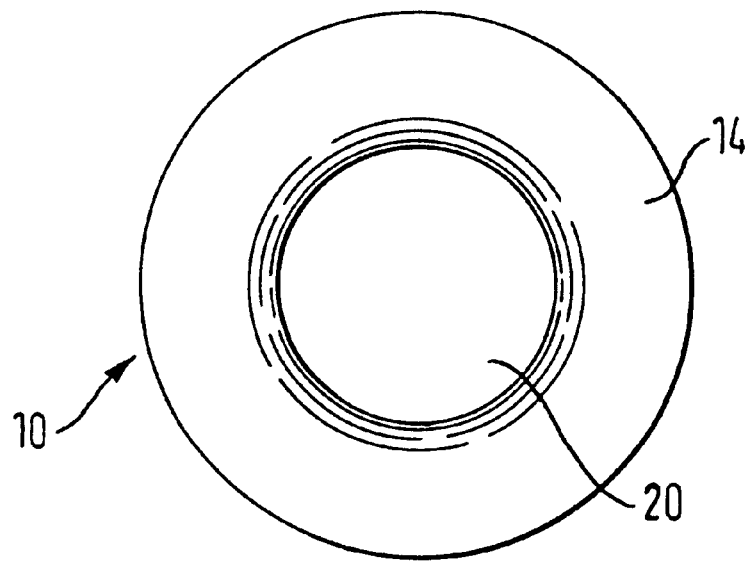
FIG. 2 is a side view of the belt reel as shown in FIG. 1.

Referring now to FIGS. 1 and 2 there is illustrated a belt reel 10 in accordance with a first embodiment of the invention. This consists of a cylindrical spool 12 provided for receiving a belt webbing, and of a collar 14, 16 at each axial end of the spool. Each collar serves to guide the belt webbing coil on the spool 12. The sleeve-shaped spool 12 as well as the collar 14 and the collar 16 are formed integrally with each other of sheet metal. The spool 12 is provided with a slot extending axially, through which the belt webbing is able to pass into the interior 20 defined by the spool where it is secured in place.

Referring now to FIGS. 3 to 6 there are illustrated schematically the various steps in the production of the belt reel as shown in FIGS. 1 and 2. The belt reel 10 is produced starting from a tube section 10' of sheet metal having a length of, for instance, 76 mm and an outer diameter of 32.6 mm, the wall thickness being approximately 1.2 mm.

Figure 3:
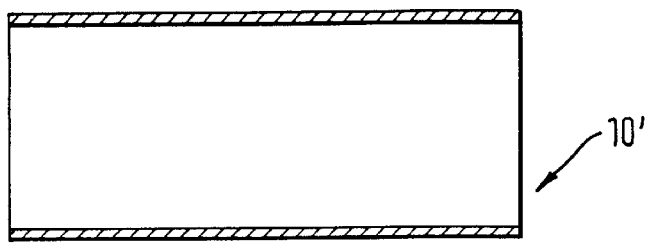
FIGS. 3 to 6 illustrate various steps in the production of the belt reel as shown in FIGS. 1 and 2.
Figure 4:
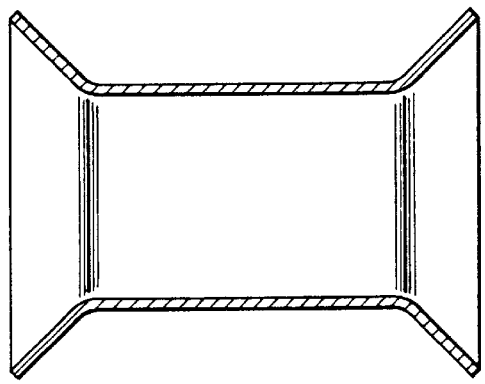
Figure 5:
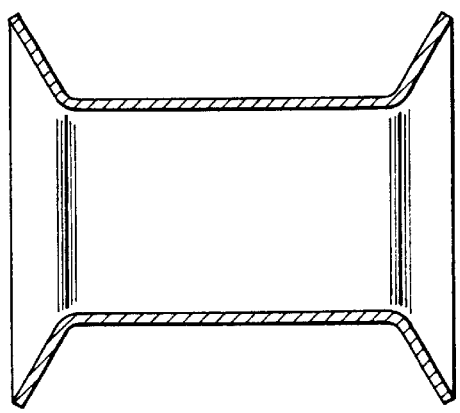
Figure 6:
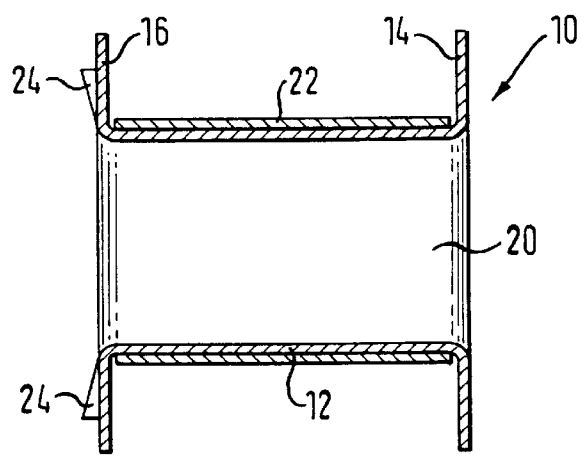

Starting from the condition as shown in FIG. 3 the axial ends of the tube section 10' are widened and bent over, so that via the intermediate states as shown in FIGS. 4 and 5 the belt reel 10 as evident from FIG. 6 is obtained. Indicated on the spool 12 is a belt webbing coil 22. The collar 16 is provided with a locking toothing formed by locking detents 24 protruding from the plane defined by the collar 16. These locking detents 24 serve to non-rotatively lock the belt reel in the belt retractor when required.

Figure 7:
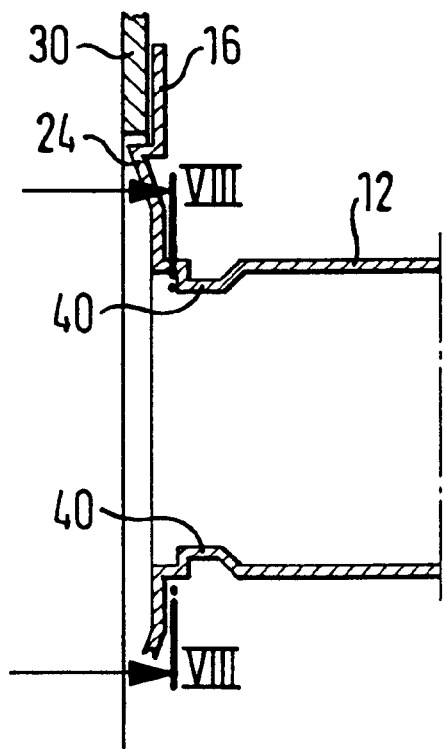
FIG. 7 is a cross-section through one end of a belt reel in accordance with a first variant of the first embodiment.
Figure 8:
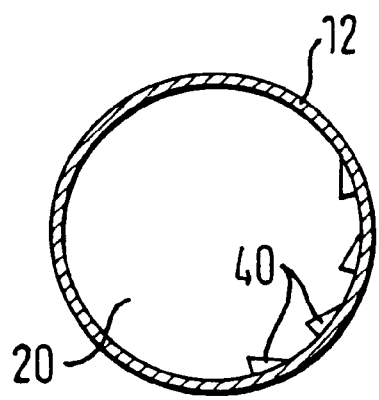
FIG. 8 is a cross-section taken along the plane VIII—VIII in FIG. 7.

Referring now to FIGS. 7 and 8 there is illustrated a first variant of the belt reel as shown in FIG. 6. Here too, the locking detents 24 are provided in the collar 16, they serving to block the belt reel. The belt retractor provided with the belt reel in accordance with the invention may be configured for example such that a side leg 30 of its frame in which the belt reel is rotatively mounted, is provided with an opening surrounding the locking toothing formed by the locking detents 24 and which in turn is provided toothed on its edge. To block the belt reel 10 it is displaced from its resting position, in which the locking toothing formed by the locking detents 24 is free to rotate in the housing leg, into a position in abutment with the teeth of the housing leg 30. Such a configuration is known from prior art as an automatic lifting reel.

Displacing the belt reel for the purpose of blocking can be initiated by means of a locking mechanism known as such which in this case may cooperate with a pilot toothing formed by the detents 40 on the interior of the spool 12. This pilot toothing can be formed at relatively little expense by impressing the wall of the sheet-metal sleeve forming the spool 12 towards the interior 20.

Figure 9:
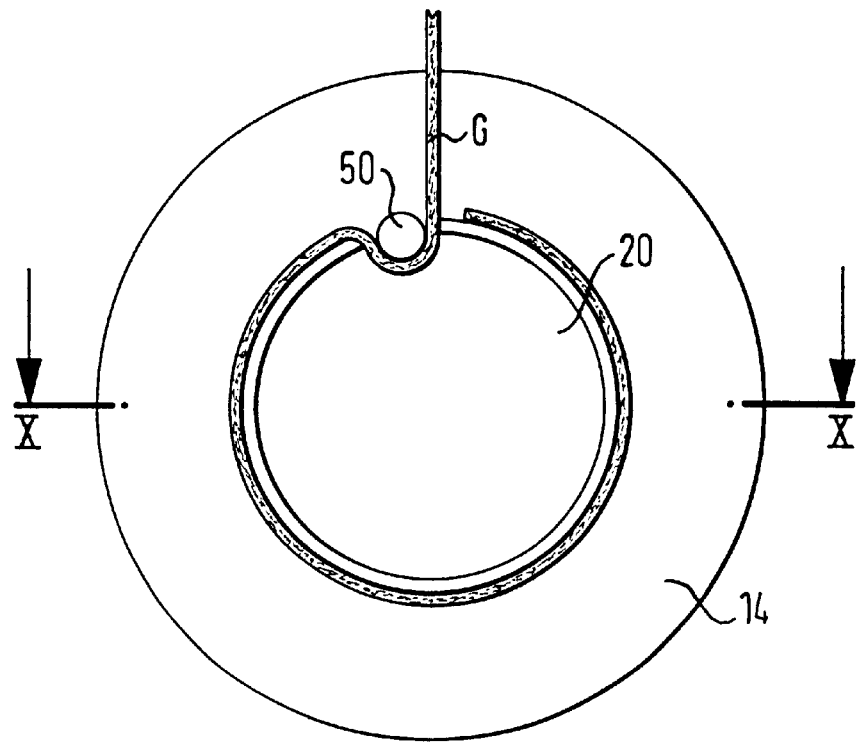
FIG. 9 is a cross-section through a belt reel in accordance with a second variant of the first embodiment.
Figure 10:
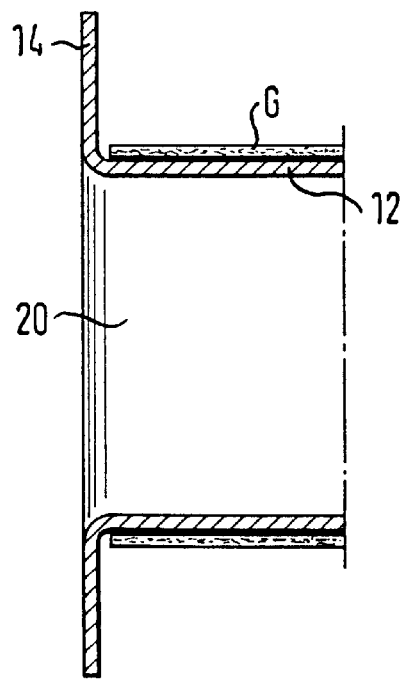
FIG. 10 is a broken view of a section taken along the plane X—X in FIG. 9.

Referring now to FIGS. 9 and 10 there is illustrated a second variant of the belt reel in accordance with the first embodiment. In this embodiment the outer surface of the spool is configured as a bonding area to which the end of the belt webbing is bonded. To make sure that only shear forces and no tensile forces can be transferred to the bonding area even when the belt webbing is totally withdrawn from the belt reel, a deflection element 50 is provided which is looped around by the belt webbing on the side of the deflection element facing the interior 20. In arriving from without, the belt webbing G thus first passes under the deflection element 50 before then running along the outer side of the spool 12.

Referring now to FIG. 11 there is illustrated a third variant of a belt reel in accordance with a first embodiment. In this embodiment the spool 12 is configured integrally with the collar 16 which also in this arrangement is provided with locking detents 24. The collar 14 is formed by a separate sheet-metal disk applied to the end of the spool 12, i.e. on the right end as viewed in FIG. 11. In this variant, the collar 14 is also provided with locking detents 24. The collar 14 is in addition provided with a bearing section 60 located within the cylinder defined by the spool. The bearing section 60 comprises a middle opening in which one axial end of a torsion bar 62 engages. This end of the torsion bar may be non-rotatively connected to the bearing section 60 of the collar 14 by any ways and means. The torsion bar serves by ways and means known as such to permit a controlled rotation of the belt reel 10 in the uncoiling direction of the belt webbing to prevent peak loads in the seat belt system by a controlled withdrawal of the belt webbing from the belt retractor. In this further development the belt webbing may be provided at its end, for example, with a loop through which the torsion bar 62 extends. In this case an axial slot, as is known from FIG. 1, is provided in the spool 12.

Referring now to FIG. 12 there is illustrated a belt reel 10 in accordance with a second embodiment. In this embodiment the spool 12 consists of two telescoped sheet-metal sleeves 70, 72, each of which is provided with a collar 14 and 16, respectively, as already known from the first embodiment. FIG. 12 shows, to make things clear, a largish spacing between the sheet-metal sleeves 70, 72 whereas in actual practice the inner diameter of the sheet-metal sleeve 70 is adapted to the outer diameter of the sheet-metal sleeve 72 such that the two sleeves are firmly fitted to each other, this resulting in the belt reel 10 having high strength.

Referring now to FIG. 13 there is illustrated a first variant of the belt reel in accordance with a second embodiment. In this embodiment the inner sheet-metal sleeve 72 is provided with an axial groove 80, whilst in the outer sheet-metal sleeve 70 the already known axial slot 18 is arranged. The belt webbing G is provided with a, for instance, stitched loop 82 which is first slipped over the inner sheet-metal sleeve 72. In this case the belt webbing G runs as evident from G in FIG. 13. Subsequently, a locating bar 84 is inserted into the groove 80 and the outer sheet-metal sleeve 70 is pushed over the inner sheet-metal sleeve 72. In so doing, the belt webbing being clamped between the two sheet-metal sleeves and the locating bar 84 due to the dimensioning of the two sheet-metal sleeves 70, 72 relative to each other, so that the run is as designated G in FIG. 13.

Figure 14:
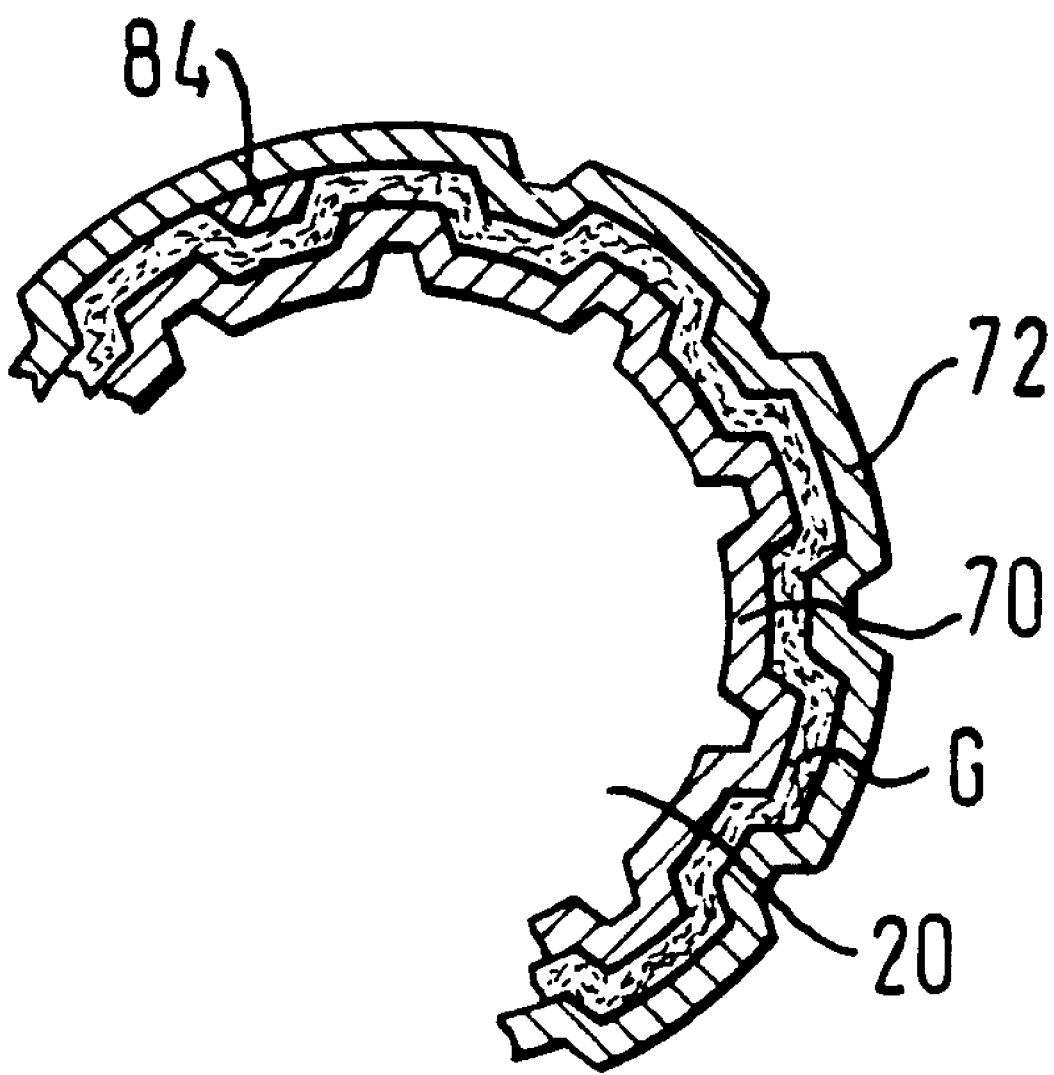
FIG. 14 is a cross-section through a belt reel in accordance with a second variant of the second embodiment.
Figure 15:
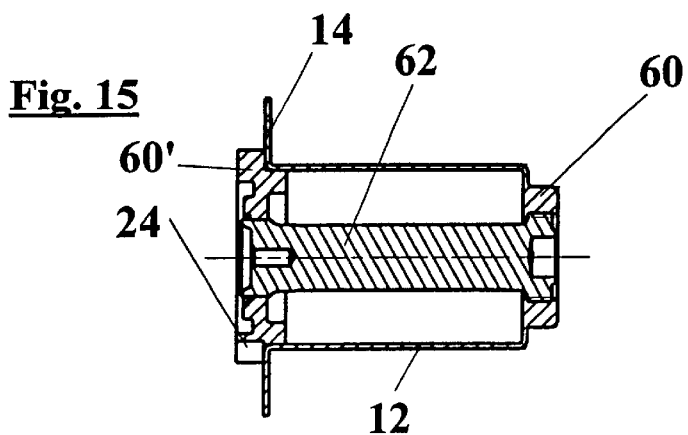
FIG. 15 is a longitudinal section through a belt reel in accordance with a third embodiment.

Referring now to FIG. 14 there is illustrated a second variant of a belt reel in accordance with the second embodiment. In this embodiment the outer sheet-metal sleeve 72 and the inner sheet-metal sleeve 70 are configured with a corrugated profile as viewed in a cross-section and they are telescoped so that the belt webbing extends between them. In addition, the locating bar 84 is used to provide at a precisely defined location a clamping force on the belt webbing G so that it is retained safely and reliably between the inner and outer sheet-metal sleeves.

Common to all embodiments of the belt reel in accordance with the invention is that as compared to prior art a particularly large constructional space is available in the interior 20 of the spool since the total wall thickness of the spool is relatively slight even in a configuration with two telescoped sheet-metal sleeves. This constructional space may be used to accommodate functional parts of a belt retractor, for example for a child restraint system or also a sensor having a locking pawl engaging the pilot toothing in the interior of the spool.

For mounting the belt reel a plastics part may be used which is inserted in the belt reel and on which a journal is configured or engaged.

FIGS. 15 and 17 to 19 show a belt reel in accordance with a third embodiment of the invention. In this embodiment as well, a torsion bar 62 is used, which is located in the interior of the belt reel. On its end which is located on the right side with respect to FIG. 15, torsion bar 62 is held non-rotatably in a bearing section 60. Bearing section 60 as well as collar 14 are formed integrally with spool 12. On its opposite, left end, torsion bar 62 is connected non-rotatably to a locking toothing 24 which is formed at a separate component 60' serving as locking disc and bearing section. In this embodiment, a force limiting action can be achieved since the belt reel may be rotated relatively to the locking toothing 24 due to torsion bar 62.

Figure 17:
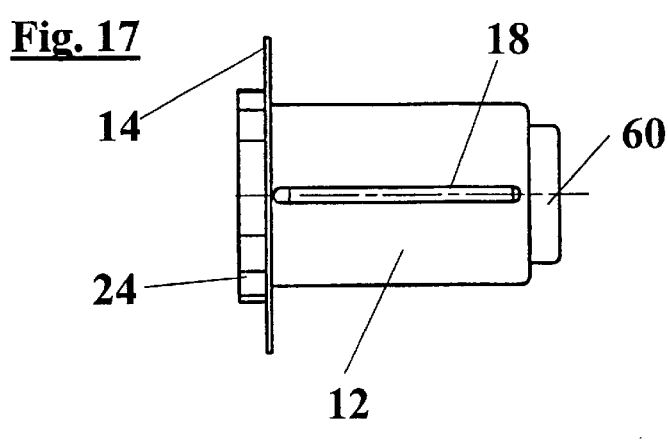
FIG. 17 is a side view of the belt reel shown in FIG. 15.
Figure 19:
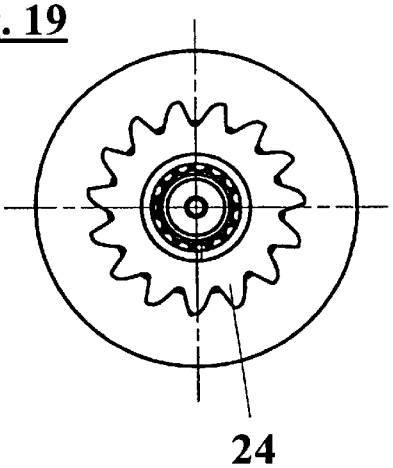
FIG. 19 is a rear view of the belt reel shown in FIG. 15.

As can be seen in FIG. 17 a slot 18 is formed in spool 12. This slot serves for connecting the belt webbing to the belt reel. The belt webbing may be provided with a closed loop which encircles the torsion bar so that the belt webbing is securely connected to the belt reel.

Figure 16:
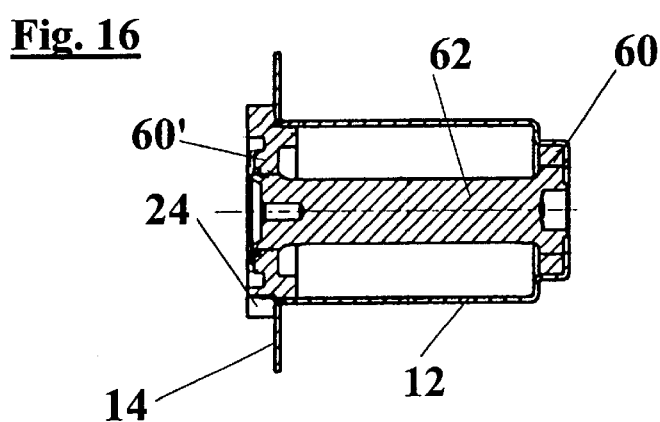
FIG. 16 is a longitudinal section through a belt reel in accordance with a variant of the third embodiment.
Figure 18:
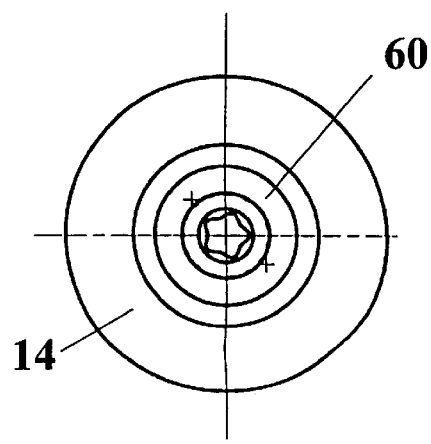
FIG. 18 is a front view of the belt reel shown in FIG. 15.

FIG. 16 shows a variant of the belt reel in accordance with the third embodiment. The belt reel shown in FIG. 16 differs from that shown in FIG. 15 in that bearing section 60 is formed as a separate part which is accommodated in an accommodation section which is formed stepped and integrally with spool 12. In this variant as well, a force limiting action may be achieved since torsion bar 62 allows a rotation of the belt reel relative to the locking toothing.

What is claimed is:

1. Apparatus comprising:

seat belt webbing;

a seat belt reel on which said seat belt webbing may be wound;

said seat belt reel comprising a cylindrical spool portion having a cylindrical outer surface on which said seat belt webbing may be wound, said seat belt reel further comprising a circular collar portion for guiding said seat belt webbing onto said spool portion;

said spool portion comprising a non-widened portion of a sheet metal tube and said collar portion comprising a widened portion of said sheet metal tube, said collar portion being located on a first axial end of said spool portion;

a passage extending axially through said spool portion and said collar portion, said passage being defined by an inner surface of said sheet metal tube;

said collar portion being coaxial with said spool portion and having an outer diameter that is greater than an outer diameter of said spool portion; and said collar portion and said spool portion being a one-piece sheet metal part.

2. The apparatus of claim 1, wherein said collar portion of said belt reel and said spool portion of said belt reel are fixed against relative rotation.

3. The apparatus of claim 2, wherein a second collar portion is configured at a second axial end of said spool portion, said second collar portion and said spool portion being fixed against relative rotation.

4. The apparatus of claim 2, wherein said collar portion is provided with locking teeth formed by locking detents protruding from a plane defined by said collar portion of said belt reel, and further including a seat belt retractor frame having an opening surrounding said locking teeth, said retractor frame having teeth engageable with said locking teeth of said collar portion.

5. The apparatus as in claim 1, wherein a slot extends through said spool portion of said belt reel, said slot extending axially across said spool portion and terminating short of said first axial end of said spool portion.

* * * * *